United States Patent
Mizukoshi et al.

(10) Patent No.: US 7,852,593 B2
(45) Date of Patent: Dec. 14, 2010

(54) METHOD AND APPARATUS FOR WRITING SERVO DATA, USING SPIRAL SERVO PATTERNS IN A DISK DRIVE

(75) Inventors: Seiji Mizukoshi, Nishitama-gun (JP); Hideo Sado, Ome (JP); Toshitaka Matsunaga, Akishima (JP); Shouji Nakajima, Kodaira (JP); Katsuki Ueda, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 275 days.

(21) Appl. No.: 12/145,044

(22) Filed: Jun. 24, 2008

(65) Prior Publication Data

US 2009/0002876 A1 Jan. 1, 2009

(30) Foreign Application Priority Data

Jun. 29, 2007 (JP) ............................. 2007-173275

(51) Int. Cl.
*G11B 21/12* (2006.01)
(52) U.S. Cl. ...................................... 360/75
(58) Field of Classification Search ............... None
See application file for complete search history.

(56) References Cited

U.S. PATENT DOCUMENTS

| 5,668,679 | A | 9/1997 | Swearingen et al. |
| 6,965,489 | B1 | 11/2005 | Lee et al. |
| 7,471,481 | B2 * | 12/2008 | Lau et al. ...................... 360/75 |
| 7,679,850 | B2 * | 3/2010 | Smith .......................... 360/75 |
| 2005/0013043 | A1 | 1/2005 | Ashiwa |
| 2007/0047132 | A1 | 3/2007 | Sado et al. |
| 2009/0067084 | A1 * | 3/2009 | Lau et al. ...................... 360/75 |

FOREIGN PATENT DOCUMENTS

JP 2000-057581 2/2000

* cited by examiner

*Primary Examiner*—Hoa T Nguyen
*Assistant Examiner*—James L Habermehl
(74) *Attorney, Agent, or Firm*—Pillsbury Winthrop Shaw Pittman, LLP

(57) ABSTRACT

According to one embodiment, a servo-writing method for use in a disk drive, in which a CPU causes a head to record final patterns in a disk, by using the multi spiral servo pattern recorded in the disk. The CPU uses a designated spiral servo pattern, positioning the head at a target position, so that the head may write the final patterns at the target position and may read sector-address data contained in the final patterns.

9 Claims, 6 Drawing Sheets

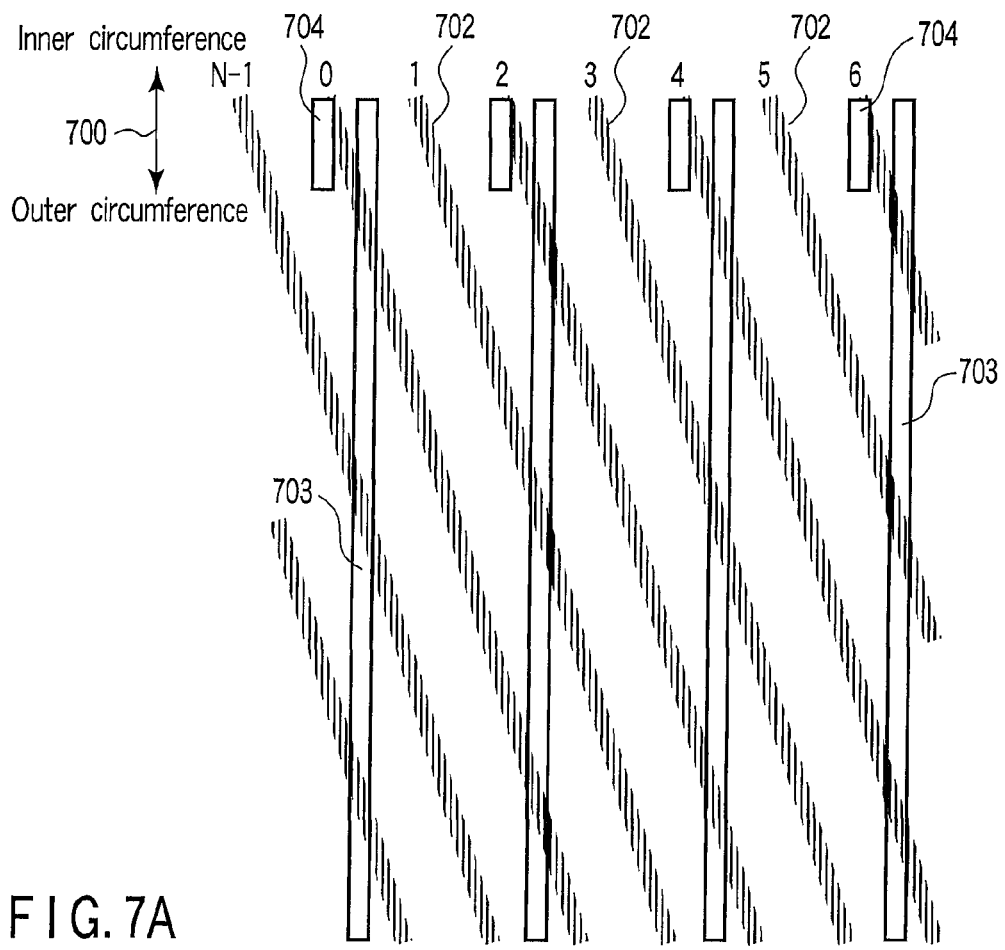
F I G. 7A
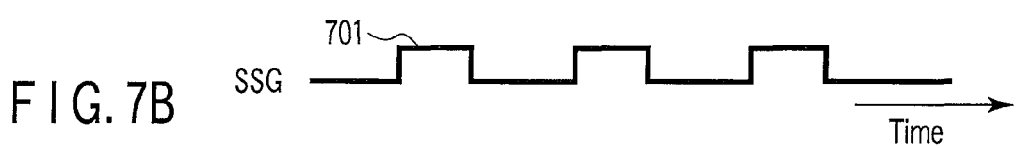
F I G. 7B
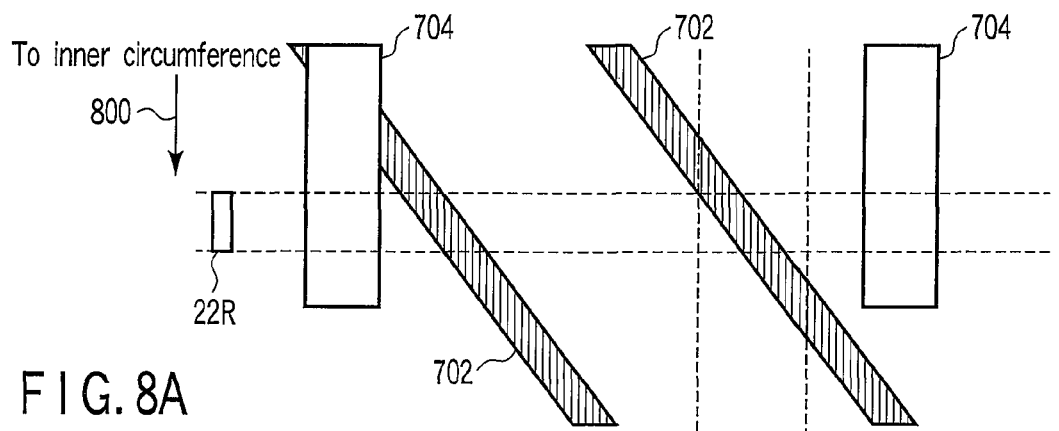
F I G. 8A
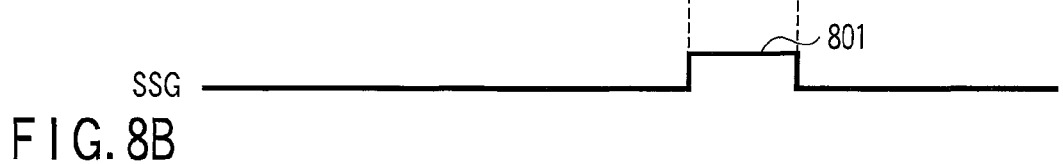
F I G. 8B

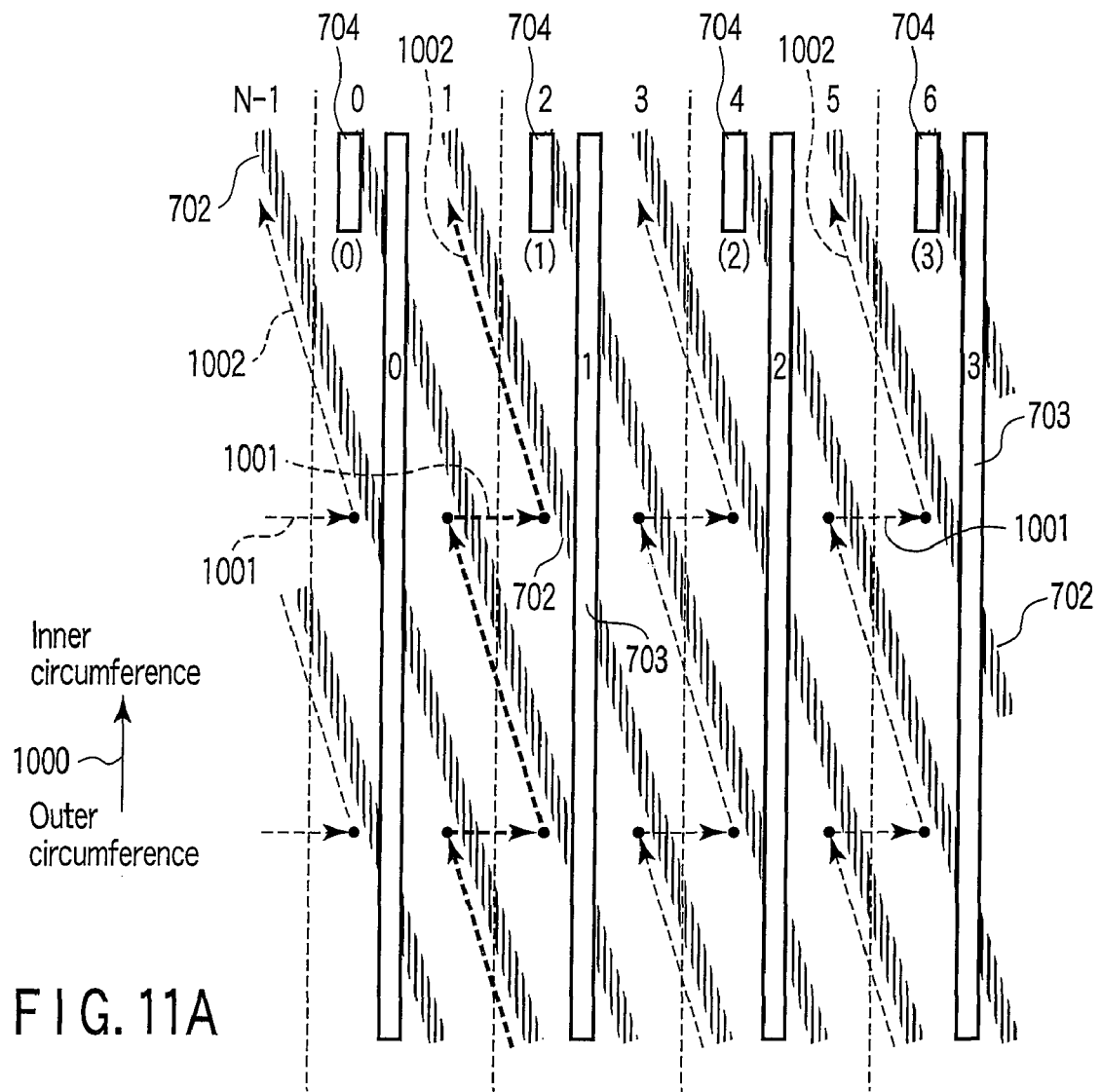
F I G. 11A
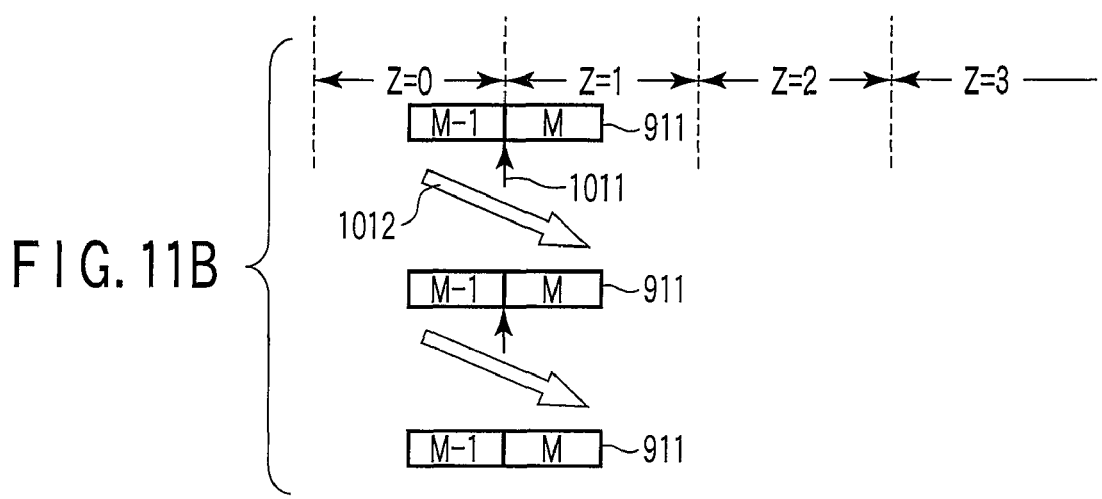
F I G. 11B

METHOD AND APPARATUS FOR WRITING SERVO DATA, USING SPIRAL SERVO PATTERNS IN A DISK DRIVE

CROSS-REFERENCE TO RELATED APPLICATIONS

This application is based upon and claims the benefit of priority from Japanese Patent Application No. 2007-173275, filed Jun. 29, 2007, the entire contents of which are incorporated herein by reference.

BACKGROUND

1. Field

One embodiment of the present invention relates to a disk drive. More particularly, the invention relates to a servo-writing technique of recording product servo patterns in a disk, by using a multi spiral servo pattern.

2. Description of the Related Art

Disk drives, a representative example of which is a hard disk drive, have a disk, i.e., magnetic data-recording medium, in which servo patterns (servo data) are recorded to be used for controlling the positioning of the head (that is, for performing servo control).

The disk drive uses the servo patterns read by the read head included in the head, in order to move the head to a target position (i.e., target track) over the disk. The read head performs an operation of reading data from the target position. The head includes a write head, too, which writes data at the target position.

The servo patterns have been recorded in the disk by performing a servo-writing step during the manufacture of the disk drive. A self-servo write method attracts attention because it may increase the efficiency of the servo-writing operation. In this method, a disk having a base pattern recorded thereon is incorporated into the disk drive, and servo patterns are recorded in the disk, based on the base pattern. Thus, the self-servo write method is a method of writing servo patterns in the disk by using the disk drive is shipped as a product from the manufacturer.

In recent years, a self-servo write method has been proposed in which radial servo patterns are recorded in a disk by using a multi spiral servo patterns as a base pattern. (See, for example, U.S. Pat. Nos. 5,668,679 and 6,965,489.) The multi spiral servo pattern is composed of a plurality of spiral servo patterns (hereinafter referred to as spiral patterns, in some cases).

The radial servo patterns are product servo patterns that constitute concentric servo tracks. The term "product servo pattern" means servo patterns that are used to control the positioning of the head after the disk drive has been shipped as a product. (Hereinafter, the radial servo patterns will be referred to as final patterns, in some cases.)

Each of the spiral patterns constituting the multi spiral servo pattern contains only servo-burst data and a sync mark, from which a position-error signal may be reproduced. The disk drive uses the multi spiral servo pattern exclusively for head tracking (namely, for positioning the head).

The multi spiral servo pattern may be used not only for tracking the head, but also for generating sector addresses that are required in recording the product servo patters (final patterns). Then, a self-servo write method can be performed, in which the multi spiral servo pattern is effectively utilized.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 7A and 7B are diagrams explaining the positional relation that the spiral pattern and final patterns have in the embodiment;

FIGS. 8A and 8B are diagrams explaining a process of searching the spiral pattern in the embodiment;

FIGS. 11A and 11B are diagrams explaining another embodiment of the present invention.

DETAILED DESCRIPTION

Various embodiments according to the invention will be described hereinafter with reference to the accompanying drawings. In general, according to one embodiment of the invention, there is provided a servo-writing method that can perform a self-servo write operation in which a multi spiral servo pattern is effectively used.

(Configurations of the Servo Track Writer and Disk Drive)

Figure 1:
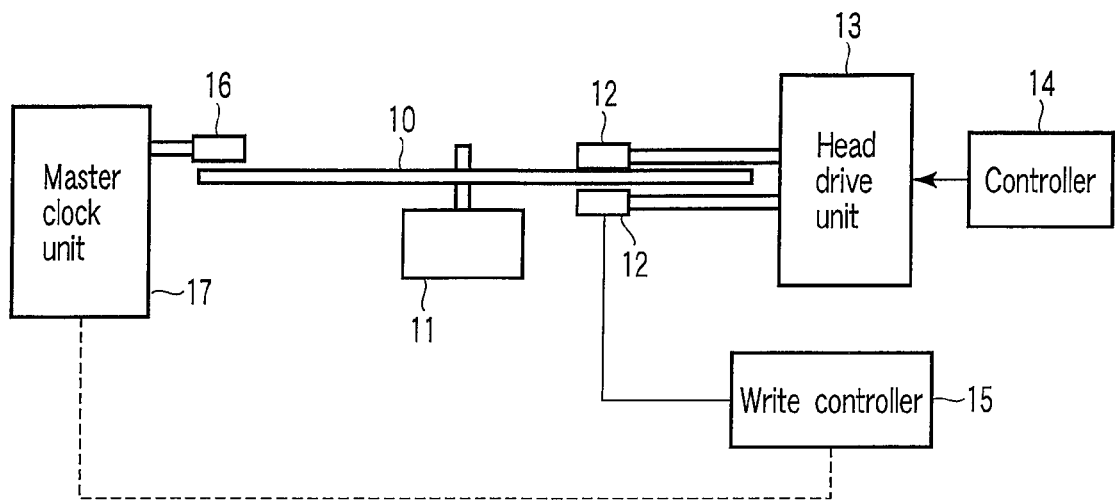
FIG. 1 is a block diagram showing the major components of a servo track writer according to an embodiment of this invention.

According to an embodiment, FIG. 1 is a block diagram showing the major components of the servo track writer (STW) which performs a servo write operation. The servo write operation is a step of writing servo patterns (servo data) in a disk 10 during the manufacture of a disk drive.

In most cases, the servo track writer is installed in a clean room and writes servo patterns in the disk 10 in which no data is written at all. As FIG. 1 shows, the servo track writer has a servo head 12, a head drive unit 13, a controller 14, a write controller 15, a clock head 16, and a master clock unit 17. The servo head 12 can write servo patterns. A spindle motor 11 is incorporated into the disk drive.

The controller 14 controls the head drive unit 13, which moves the servo head 12 to a designated position on the disk 10 that the spindle motor 11 is rotating. The write controller 15 supplies servo data to the servo head 12. The servo head 12 writes the servo patterns represented by the servo data, at the designated position on the disk 10.

Figure 5:
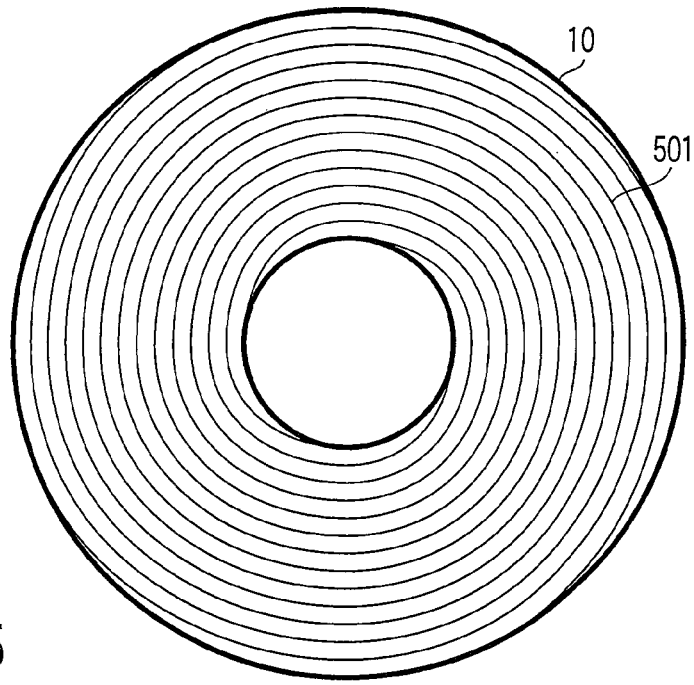
FIG. 5 is diagram showing an example of a multi spiral servo pattern according to the embodiment.

In the present embodiment, the servo track writer writes spiral servo patterns, as a base pattern 501, in the disk 10 as shown in FIG. 5. In practice, a multi spiral servo pattern consisting of a plurality of spiral servo patterns (hereinafter called spiral patterns) is written as base pattern 501 in the disk 10.

Figure 2:
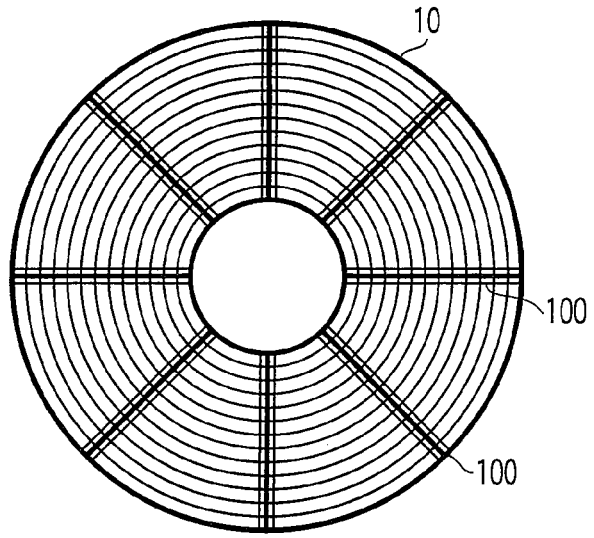
FIG. 2 is a diagram showing a disk according to the embodiment, illustrating the final patterns (or product servo patterns) recorded in the disk.

Further, in the present embodiment, a self-servo write operation is performed, writing radial servo patterns in the disk 10 as is illustrated in FIG. 2. The radial servo patterns constitute concentric servo tracks.

Figure 4:
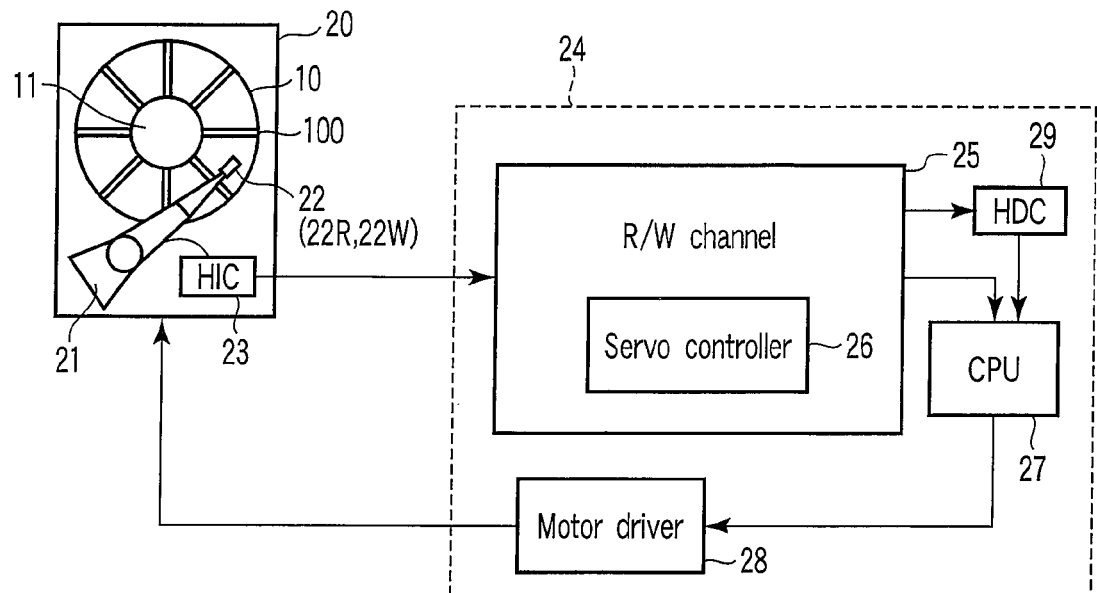
FIG. 4 is a block diagram showing the major components of a disk drive according to the embodiment.

To perform the self-servo write operation, the disk 10 in which a base pattern 501 has been written by the servo track writer is incorporated into the disk drive 20 as shown in FIG. 4. In the disk drive 20, which is a product to be shipped, the head 22 is controlled in position in accordance with the base pattern 501 recorded in the disk 10. The head 22 writes final patterns (product servo patterns), i.e., radial servo patterns in the disk 10.

Figure 3:
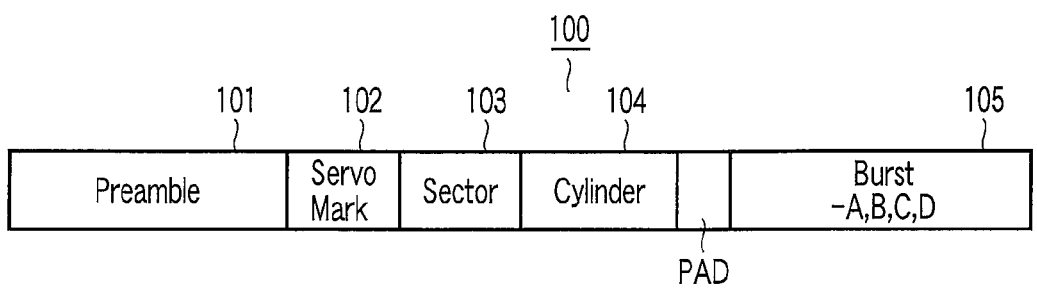
FIG. 3 is a diagram representing the configuration of a final pattern according to the embodiment.

As FIG. 2 shows, each final pattern consists of servo sectors 100 that extend in the radial direction of the disk 10 and constitute concentric servo tracks. In other words, each servo track consists of a plurality of servo sectors 100 (8 servo sectors in this embodiment), which are arranged at regular intervals in the circumferential direction of the disk 10. As FIG. 3 shows, each servo sector 100 includes a preamble 101, a servo mark 102, a selector address 103, a cylinder (track) address 104, postamble data (PDA), and servo-burst patterns (A to D).

As FIG. 4 shows, the disk drive 20 has an actuator (head-moving mechanism) 21, a head amplifier 23, and a circuit board 24. The actuator 21 holds the head 22. The head 22 has a read head 22R and a write head 22W. The read head 22R is configured to read data (including servo patterns) from the disk 10. The write head 22W is configured to write data in the disk 10.

The actuator 21 has a voice coil motor (VCM). The voice coil motor can be driven with a current supplied from a motor driver 28, which will be described later. When the VCM is driven, the actuator 21 is rotated, moving the head 22 in the radial direction of the disk 10.

The circuit board 24 holds a read/write (R/W) channel 25, a microprocessor (CPU) 27, a motor driver 28, and a disk controller (HDC) 29. The read/write channel 25 includes a servo controller 26.

The read/write channel 25 is a signal-processing circuit that processes servo patterns and read/write signals representing user data. The read/write channel 25 reproduces the user data the read head 22R has read from the disk 10. The user data is supplied from the read/write channel 25 to the HDC 29. The read/write channel 25 receives the user data from the HDC 29 and converts the same to a write signal. The write signal is output from the read/write channel 25 to the head amplifier 23.

The servo controller 26 has the function of reproducing the base pattern 501 and the final patterns. To perform this function, the servo controller 26 includes a detection unit, a demodulation unit, and a data-generating unit. The detection unit is configured to detect sector addresses 103 and cylinder addresses 104. The demodulation unit is designed to demodulate the base pattern 501 and the servo-burst patterns 105. The data-generating unit uses the outputs of the detection unit and demodulation unit to generate position data. The servo controller 26 outputs to the CPU 27 the position data that represents the position the head 22 assumes over the disk 10.

Controlled by the CPU 27, the motor driver 28 drives the spindle motor 11 and the voice coil motor of the actuator 21. The CPU 27 is the main controller of the disk drive 20 and can perform the self-servo write operation according to the present embodiment.

Note that FIG. 4 illustrates only those components of the disk drive 20 which characterize the present embodiment. A part of the servo controller 26 may be provided in the HDC 29. If this is the case, the read/write channel 25 includes the demodulation unit and the detection unit that detects the address data (103, 104). The output of the detection unit is output to the HDC 29. The HDC 29 generates position data, which is output to the CPU 27.

(Self-Servo Write Operation)

In the self-servo write operation, the CPU 27 uses the spiral patterns, i.e., base pattern 501 recorded in the disk 10, as tracking patterns. Thus, the CPU 27 performs a tracking operation, or positions the head 22 at a target position over the disk 10.

As shown in FIGS. 2 and 3, the write head 22W included in the head 22 writes in the disk 10 a final pattern (i.e., product servo pattern) that can be used in the disk drive 20, i.e., a product to be shipped. The final pattern consists of radial servo patterns (servo sectors 100) that constitute concentric servo tracks.

The base pattern 501 is recorded in the disk 10 by the servo track writer shown in FIG. 1. The base pattern 501 is composed of, for example, about 200 to 300 spiral patterns, as shown in FIG. 5. Each spiral pattern has, for example, a length corresponding to 10 to 20 turns of the disk 10, and is written in the disk 10 as the servo track writer performs one full-seek operation.

Figure 6:
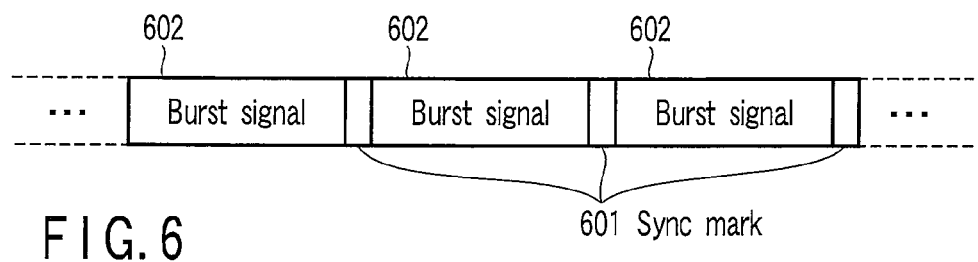
FIG. 6 is a diagram representing the configuration of a spiral pattern according to the embodiment.

As FIG. 6 shows, each spiral pattern consists of many sync marks 601 and many servo-burst signals 602, which are alternately recorded. The servo-burst signals 602 are used to detect a position error of the head 22. Note that the spiral pattern contains no data that corresponds to the sector addresses 103 or cylinder address 104 contained in each final pattern.

As shown in FIGS. 7A and 7B, the base pattern 501 is composed of a plurality of spiral patterns 702 that are arranged parallel to one another and at regular intervals. In FIGS. 7A and 7B, the horizontal axis indicates time and the vertical axis indicates positions (a range 700) in the radial direction on the disk 10.

As FIGS. 7A and 7B and FIGS. 8A and 8B show, reference servo patterns 704 (hereinafter referred to as seed patterns) are recorded in the innermost circumferential region of the disk 10. The seed servo patterns 704 constitute concentric servo tracks. The seed servo patterns 704 are identical in configuration to the final patterns (see FIG. 3).

The self-servo write operation according to this embodiment will be explained with reference to FIGS. 7A, 7B, 8A, 8B, 9A and 9B and the flowchart of FIG. 10.

At first, the CPU 27 makes the head 22 lie over the disk 10. Then, the CPU 27 supplies a constant current to the VCM via the motor driver 28. The motor driver 28 drives the actuator 21, which moves the head 22 until the head 22 abuts on the inner-circumference stopper that is provided in the disk drive 20. The head 22 is thereby positioned at the innermost circumferential region of the disk 10.

In this state, the CPU 27 causes the read head 22R to start a reading operation as shown in FIG. 8A. Thus, the read head 22R searches for the seed patterns 704 (Block S1). Upon finding seed patterns 704, the CPU 27 starts a tracking operation to position the head 22 (more precisely, read head 22R) at a servo track where the seed patterns 704 are recorded (Block S2).

Next, the CPU 27 uses a spiral servo gate SSG, searching for spiral patterns 702, as is illustrated in FIG. 8B (Block S3). The spiral servo gate SS3 is a timing signal for reading the spiral patterns 702 that are recorded in the disk 10 and arranged at regular intervals. The spiral servo gate SSG is generated by the HDC 29 as in most disk drives.

The process of searching for the spiral patterns 702 is performed by gradually moving the head 22 to the outer circumference 800 of the disk 10 as shown in FIG. 8A. As FIG. 8B shows, this process is terminated when the read head 22R arrives at the position (equivalent to part 801 of spiral servo gate SSG) where the head 22R can read the spiral patterns 702.

Once the process of searching for the spiral patterns 702 is completed, the CPU 27 starts the tracking (positioning) of the head 22, using the spiral patterns 702. That is, the CPU 27 starts the tracking operation, without using the seed patterns, from the moment the spiral patterns 702 are found.

FIGS. 7A and 7B are diagrams showing the positional relation between the spiral patterns 702 used in the tracking operation and the final patterns 703 which are to be written. (In FIG. 7A, arrow 700 indicates the radial direction in which the head 22 is moved.) In the pattern format according to the present embodiment, two spiral patterns 702 are provided for one final pattern 703. The CPU 27 uses N spiral patterns 702 while performing the tracking of the head 22. The final patterns 703 are thereby written in the disk 10 (Block S6).

As indicated above, the spiral servo patterns 702 contain no cylinder addresses. Therefore, the CPU 27 detects the position of the head 22 takes with respect to the radial direction of the disk 10, from the data representing the position of the spiral servo gate SSG. The CPU 27 can acquires the data representing the relative positions of, for example, 10 to 20 cylinders (tracks) following, for example, a servo gate 701, depending on the slope of the spiral servo patterns 702. The CPU 27 needs to start a seek operation at, for example, a fixed position at an inner track (i.e., reference position defined by the seed patterns 704).

A method of moving the head 22 in the radial direction of the disk 10, or performing a seek operation, will be explained with reference to FIGS. 9A and 9B.

Figure 9A:
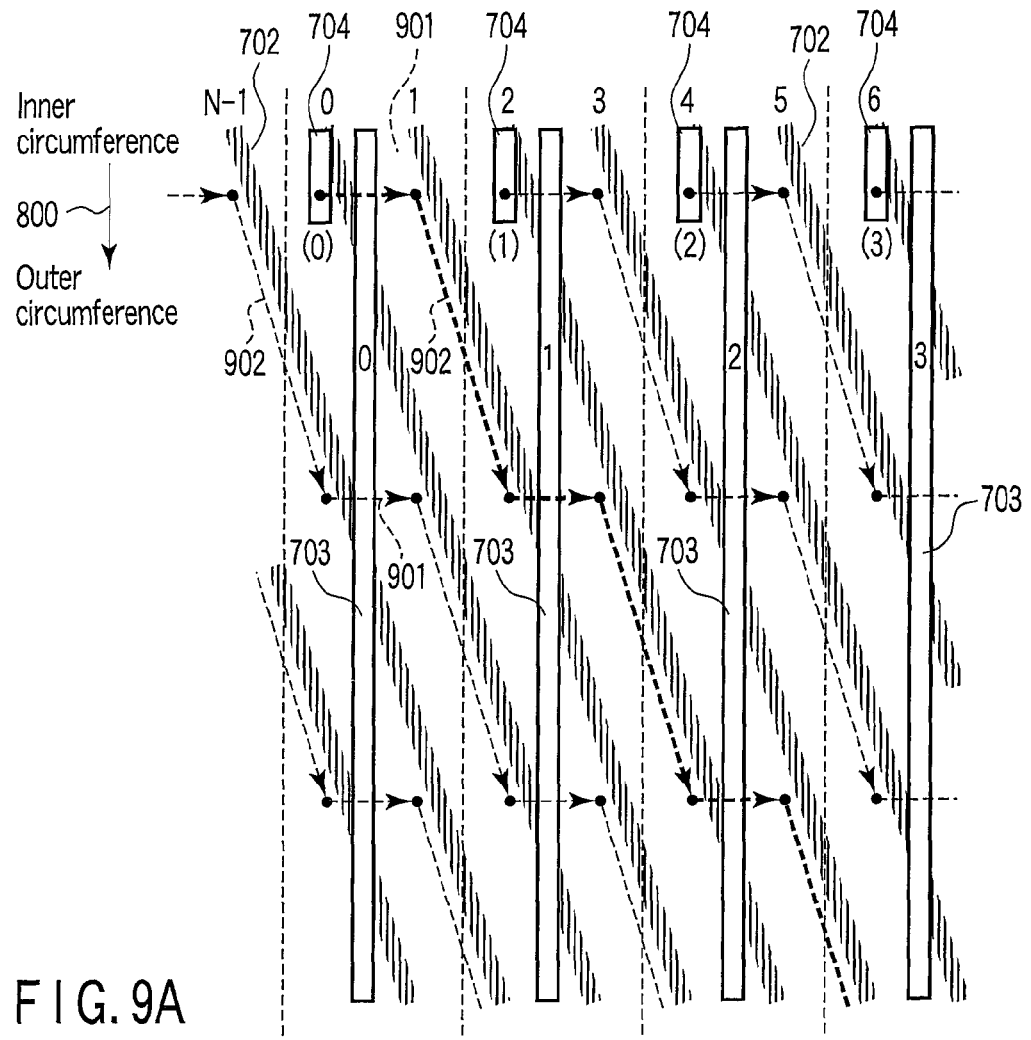
FIGS. 9A and 9B are diagrams explaining a method of generating sector addresses, according to the embodiment.
Figure 10:
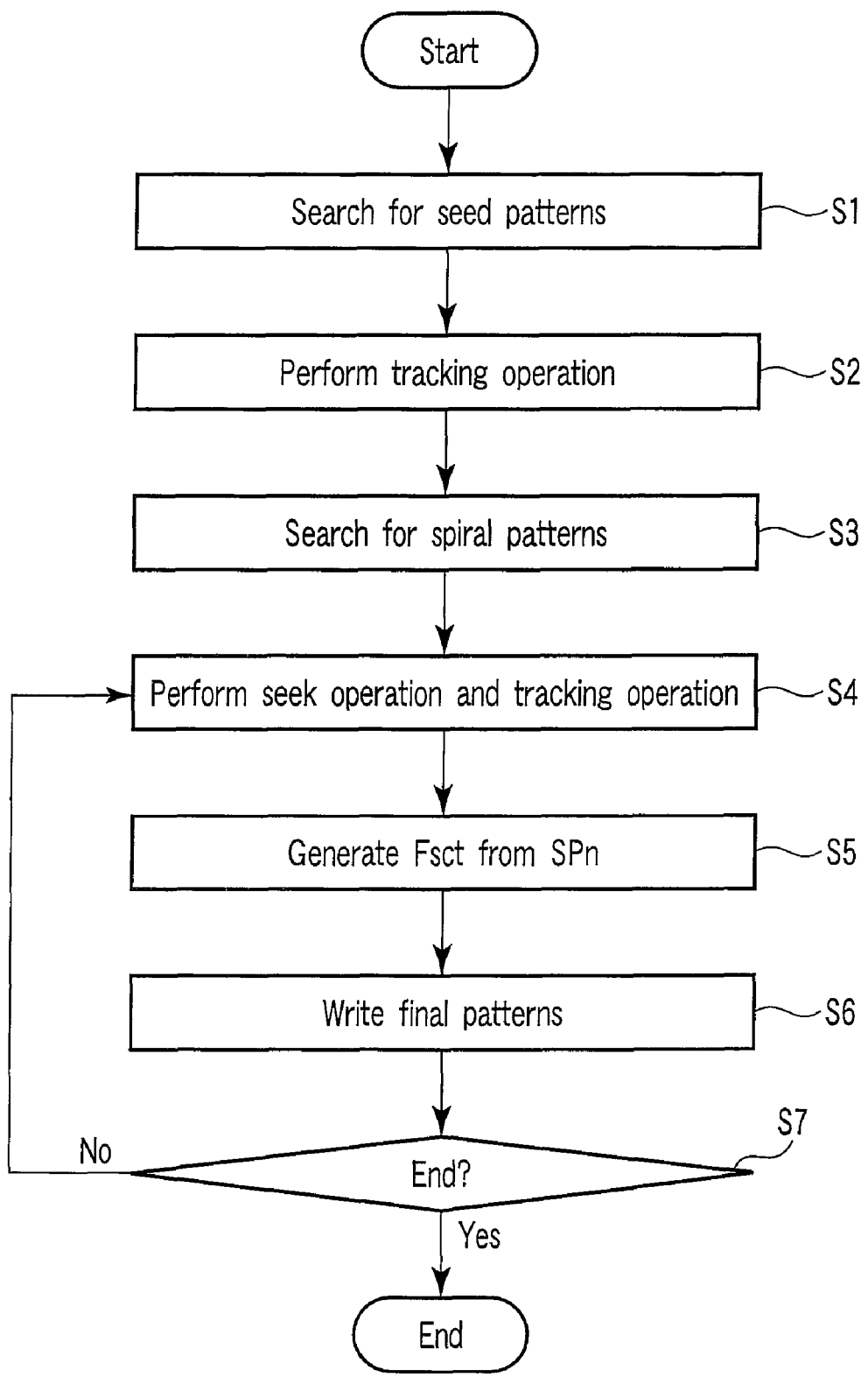
FIG. 10 is a flowchart explaining the sequence of a self-servo write operation according to the embodiment.

As FIG. 9A shows, the CPU 27 performs a seek operation 902 in accordance with the servo gate SSG, moving the head 22 that has detected, for example, spiral pattern No. N-1, along this spiral pattern. The tracking operation is achieved, moving the head 22 to a write region of sector No. 0 (Block S4). Then, the CPU 27 generates a sector address (Block S5), causing the write head 22W of the head 22 to write a final pattern 703 in the write region of sector No. 0 (Block S6).

While the write head 22W is writing the final pattern 703, the read head 22R of the head 22 cannot read the spiral pattern 702 that overlaps the write region of sector No. 0. The CPU 27 therefore performs a seek operation 901, causing the head 22 to move to the adjacent spiral pattern 702 (No. 0), without moving over the write region in which the final pattern 703 is being written. That is, the CPU 27 repeats the seek operation 902 over the same spiral pattern 702 and the seek operation 901 over an even-numbered spiral pattern and the adjacent odd-numbered spiral pattern, thereby accomplishing a seek operation that does not use the write region in which the final pattern 703 is being written.

A process of generating the sector address included in the final pattern 703 which is to be written in the disk 10 (i.e., Block S5 shown in the FIG. 10) will be explained.

In the present embodiment, the number of the spiral patterns consisting of the multi spiral servo pattern recorded on the disk 10 is set twice as large as the number of final patterns 703 which are to be written. Note that the serial numbers of the spiral patterns will be hereinafter referred to as SPn (n=0, 1, 2 . . . ).

The sector-address numbers Fsct of the final patterns 703 can be obtained by the following equation (1):

$$Fsct=int(SPn/2) \qquad (1)$$

where "int" means that figures at any decimal place have been omitted.

That is, the sector address number Fsct of any final pattern 703 can be obtained, merely by dividing the spiral pattern number SPn by two (2). When the seek operations 901 and 902 are performed, however, a discrepancy may develop between the spiral pattern number and the sector number of the final pattern as the head 22 moves in the radial direction of the disk 10.

Figure 9B:
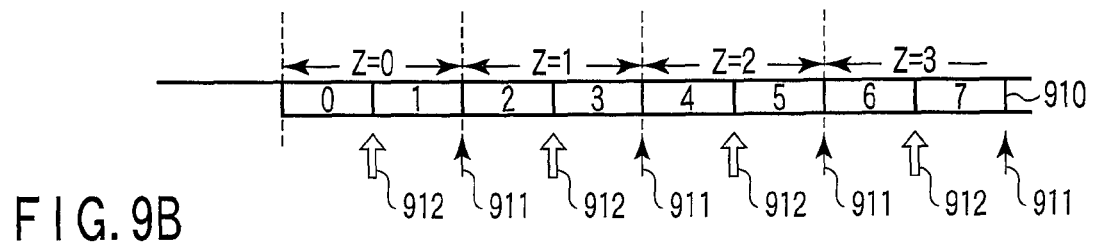

The CPU 27 therefore uses a counter 910 shown in FIG. 9B, eliminating the discrepancy between the spiral pattern number and the sector number of the final pattern. More specifically, the CPU 27 performs the following calculation.

The CPU 27 uses the count value Ncnt of the counter 910, as well as the spiral pattern number SPn and the sector address number Fsct. Let the region number the CPU 27 uses as index of a positioning parameter in order to position the head 22 be expressed as SPz (z=0, 1, 2, . . . ).

The CPU 27 sets two conditions in which the counter 901 may perform a count-up. In the first condition, the counter 901 counts up based on the servo gate SSG, at time 911 when the head 22 passes the middle region between any two adjacent final patterns 703. In the second condition, the counter 901 counts up at time 912 when the head 22 moves from one spiral pattern to the next spiral pattern.

The CPU 27 calculates the sector address number Fsct of the final pattern 703 written immediately after the spiral pattern number SPn, by using the following conversion equation (2):

$$Fsct=SPz+(Ncnt \bmod 2) \qquad (2)$$

where mod is a modulo operator.

That is, the CPU 27 refers to the region number that is used as an index of a positioning parameter during the tracking of the head 22, thus calculating the sector address number Fsct of the final pattern 703.

The spiral pattern number SPn can be used to calculate the count value Ncnt and the region number SPz, by using the following conversion equation (3):

$$SPn=SPz+int((Ncnt+3)/4) \qquad (3)$$

In the method of moving the head 22, described above, the CPU 27 uses a region number SPz as an index of a positioning parameter in order to position the head 22 at the write region of a final pattern 703 in accordance with the spiral pattern 702 (see the conversion equation (3)).

Further, the CPU 27 calculates the sector address number Fsct contained in the final pattern 703, from the number of times the spiral patterns 702 have been switched from one to another and also the serial numbers Spn assigned to the spiral patterns 702 (see the conversion equation (2).) Hence, final patterns 703, i.e., product servo patterns, can be written in the disk 10 based on the base pattern 501 before the disk drive 20 is shipped from the manufacturer.

In the present embodiment, not only the tracking operation is performed, but also sector addresses are generated, by using the multi spiral servo pattern. Thus, a self-servo write operation can be accomplished, effectively utilizing the multi spiral servo pattern.

Another Embodiment

FIGS. 11A and 11B are diagrams explaining another embodiment of the present invention.

In the embodiment described above, the final patterns 703 are written in the disk 10, during the seek operation in which the head 22 is gradually moved to the outer circumference 800 of the disk 10 as shown in FIG. 9A. In the present embodiment, final patterns 703 are written during the seek operation in which the head 22 is gradually moved in the opposite direction, that is, from the outer circumference 800 of the disk 10 to the inner circumferential region of the disk 10 as is illustrated in FIG. 11A.

In the reverse-direction seek operation, too, the CPU 27 repeats a seek operation 1002 over the same spiral pattern 702 and the seek operation 1001 over an even-numbered spiral pattern and the adjacent odd-numbered spiral pattern, thereby accomplishing a seek operation that does not use the write region in which a final pattern 703 is being written.

In the present embodiment, the CPU 27 uses the count value of a counter 911 to eliminate the discrepancy between the spiral pattern number and the sector number of the final pattern as is illustrated in FIG. 11B. During the seek operation 1002, the head 22 moves in the opposite direction. Therefore, the CPU 27 makes the counter 911 perform a count-down at time 1011 when the head 22 passes the middle region of the final pattern during the seek operation 1002. At time 1012 when the head 22 moves to the next spiral pattern 702, the CPU 27 makes the counter 911 perform a count-up, because the head 22 is now moving in the same direction as in the above-described embodiment.

Thus, the count value of the counter 911 is alternately M and M−1. The counter 911 used in this embodiment is identical to the counter 910 used in the above-described embodiment. Therefore, the conversion equations (2) and (3), given above, are applied in this embodiment, too.

Also in this embodiment, the CPU 27 can calculate the sector address number Fsct contained in the final pattern 703, from the number of times the spiral patterns 702 have been switched from one to another (1001) and also the serial numbers Spn assigned to the spiral patterns 702. Hence, the final patterns 703, i.e., product servo patterns, can be written in the disk 10 based on the base pattern 501 before the disk drive 20 is shipped from the manufacturer.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A servo-writing method comprising:
   positioning a head at a target position on a disk by using a designated spiral servo pattern, in order to write a final pattern at the target position;
   generating sector addresses to be contained in the final pattern, from the designated spiral servo pattern; and
   causing the head to write the final pattern containing a sector address, at the target position on the disk.

2. The method according to claim 1, wherein the spiral servo pattern recorded in the disk is composed of a prescribed number of spiral servo patterns which are arranged parallel to one another and at regular intervals.

3. The method according to claim 1, wherein the sector addresses are generated by using the serial numbers assigned to the spiral servo patterns.

4. The method according to claim 1, wherein the head is positioned by performing a first seek operation of moving the head over the same spiral servo pattern and a second seek operation of moving the head over adjacent spiral servo patterns.

5. The method according to claim 4, wherein the number of times the second seek operation has been repeated.

6. The method according to claim 1, wherein the spiral servo pattern is composed of spiral servo patterns which are arranged every two spiral servo patterns being provided for one final pattern, and the sector addresses are generated, as serial numbers allocated to sectors in accordance with the serial numbers assigned to the spiral servo patterns.

7. The method according to claim 1, wherein the sector addresses are generated in accordance with the number of times the head has passed a write region during a seek operation to write the final patterns in the write region.

8. The method according to claim 1, wherein seed patterns to be used to position the head at the reference position are recorded in an inner or outer circumferential region of the disk.

9. The method according to claim 8, further comprising:
   searching for a designated spiral servo pattern by first positioning the head at a reference position in accordance with the seed patterns and then moving the head from the reference position.

* * * * *